United States Patent [19]
Ortyn et al.

[11] Patent Number: 5,715,326
[45] Date of Patent: Feb. 3, 1998

[54] CYTOLOGICAL SYSTEM ILLUMINATION INTEGRITY CHECKING APPARATUS AND METHOD

[75] Inventors: William E. Ortyn, Devall; Louis R. Piloco; Jon W. Hayenga, both of Kent, all of Wash.

[73] Assignee: NeoPath, Inc., Redmond, Wash.

[21] Appl. No.: 303,179

[22] Filed: Sep. 8, 1994

[51] Int. Cl.⁶ ............. G06K 9/00; G06K 9/38; G01N 33/48
[52] U.S. Cl. ............. 382/128; 382/274; 356/39; 356/42
[58] Field of Search ............. 382/128, 274; 250/205; 356/42, 39

[56] References Cited

U.S. PATENT DOCUMENTS

| | | | |
|---|---|---|---|
| 4,232,970 | 11/1980 | Sawamura et al. | 382/128 |
| 5,030,008 | 7/1991 | Scott et al. | 382/128 |
| 5,079,698 | 1/1992 | Grenier et al. | 382/128 |
| 5,216,596 | 6/1993 | Weinstein | 382/128 |
| 5,255,069 | 10/1993 | Suarte | 356/354 |
| 5,361,140 | 11/1994 | Hayenga et al. | 348/257 |
| 5,428,690 | 6/1995 | Bacus et al. | 382/128 |
| 5,475,420 | 12/1995 | Buchin | 348/72 |
| 5,506,675 | 4/1996 | Lopez et al. | 356/153 |

Primary Examiner—Andrew Johns
Assistant Examiner—Monica S. Davis
Attorney, Agent, or Firm—Hans I. Sun; Emil Moffa

[57] ABSTRACT

A method for checking cytological system illumination including the steps of checking global illumination variation, static field uniformity, dynamic field uniformity, specimen thickness variation, strobe repeatability, calibration plate cleanliness, and strobe dropout. A calibration plate and test target is employed for various illumination checks.

2 Claims, 15 Drawing Sheets

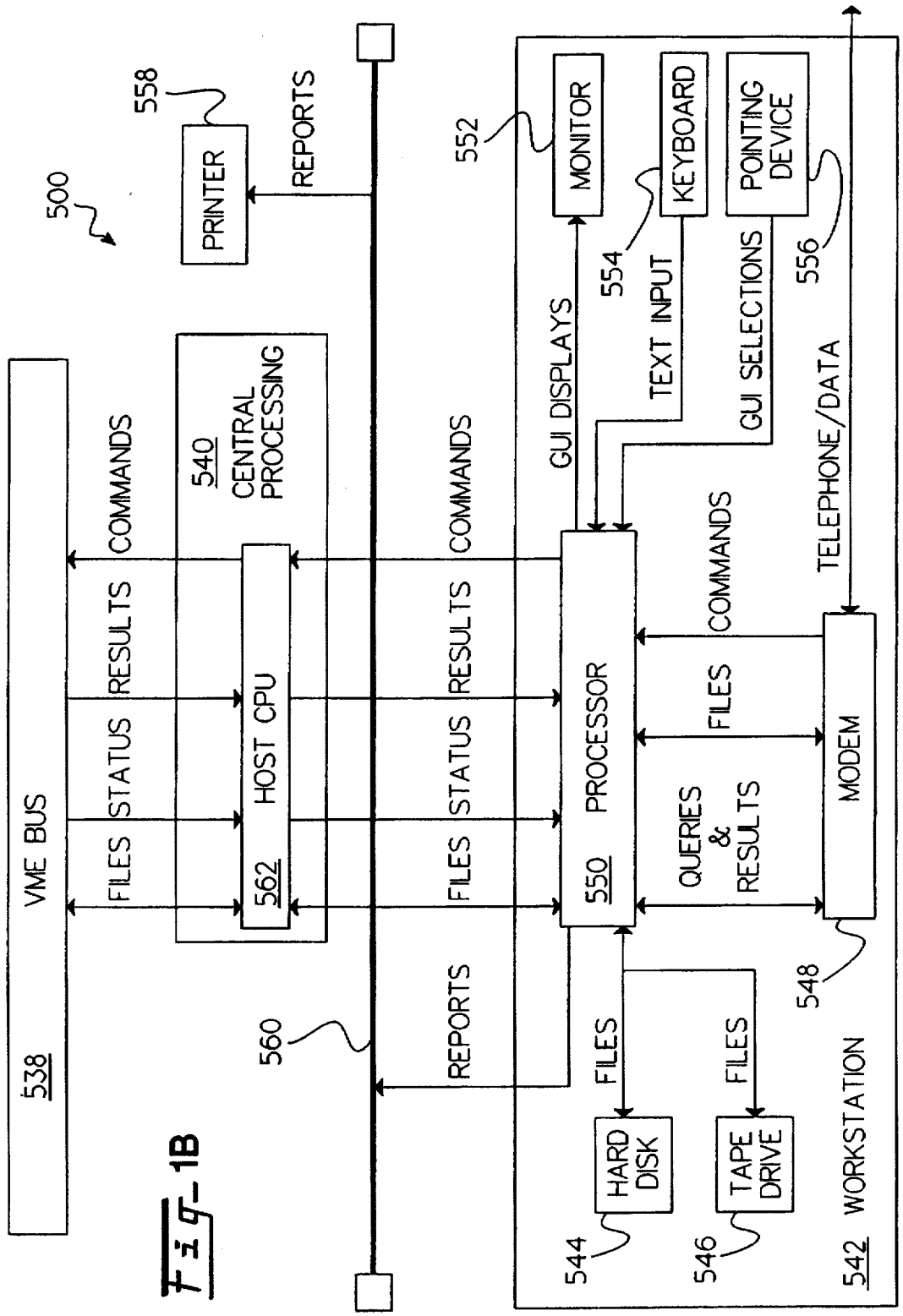

CYTOLOGICAL SYSTEM ILLUMINATION INTEGRITY CHECKING APPARATUS AND METHOD

BACKGROUND OF THE INVENTION

1. Field of the Invention

The present invention relates to a method and apparatus for evaluation of temporal and spatial variation of illumination in automated machine vision instruments. More specifically, the evaluation is conducted to characterize variations in global illuminance, static field intensity, dynamic field intensity, strobe repeatability, and intensity due to factors such as, for example, specimen thickness and cleanliness of system calibration hardware. Still more particularly, the present invention relates to automated instruments used for analyzing biological or cytological specimens, such as sputum samples, urine samples or pap smears.

2. Discussion of the Prior Art

Automated analysis of biological specimens requires a high degree of spatial and temporal uniformity for accurate and repeatable evaluation. Those evaluations often measure photometric properties such as nuclear and cytoplasm optical density. In order to accurately and repeatably measure these properties, the illumination must maintain a high degree of uniformity across the field of view and from collected image to collected image. In addition, morphological operations are conducted to segment various objects in the field of view for further analysis to determine various feature values related to size, shape and frequency content, among other factors. Operations used in such analyses tend to exhibit nonlinear behavior due to various thresholding schemes that may be employed. Therefore, accurate and repeatable behavior of these processing methods also necessitates a high degree of uniformity across each field of view and from collected image to collected image.

SUMMARY OF THE INVENTION

The present invention provides a method for checking system illumination in an automated cytological system comprising the steps of checking global illumination variation, static field uniformity, dynamic field uniformity, specimen thickness variation, strobe repeatability, calibration plate cleanliness, and strobe dropout.

It is an object of this invention to provide a means to characterize global illumination variation.

It is an object of this invention to provide a means to characterize static field uniformity.

It is an object of this invention to provide a means to characterize dynamic field uniformity.

It is an object of this invention to provide a means to characterize field uniformity variations due to specimen thickness. As used herein specimen thickness refers to the combined thickness of the substrate, objects of interest, mounting media and coverslip.

It is an object of this invention to provide a means to characterize strobe repeatability.

It is an object of this invention to provide a means to characterize cleanliness of system calibration hardware.

It is an object of this invention to provide a means to characterize an acceptable amount of strobe dropout behavior.

It is an object of this invention to provide a means to characterize and evaluate the acceptability of illumination for automated cytological analysis.

It is an object of this invention to provide a runtime means to characterize and evaluate the acceptability of illumination for automated cytological analysis.

It is an object of this invention to provide a runtime means to characterize and evaluate the acceptability of illumination for an automated vision interpretation system for the analysis of pap smears.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIGS. 1A, 1B, 1C and 1D show an automated cytology system and the placement of a calibration and test target into an optical path of an automated microscope as employed by the method and apparatus of the invention.

DETAILED DESCRIPTION OF THE PREFERRED EMBODIMENT

Figure 1A:
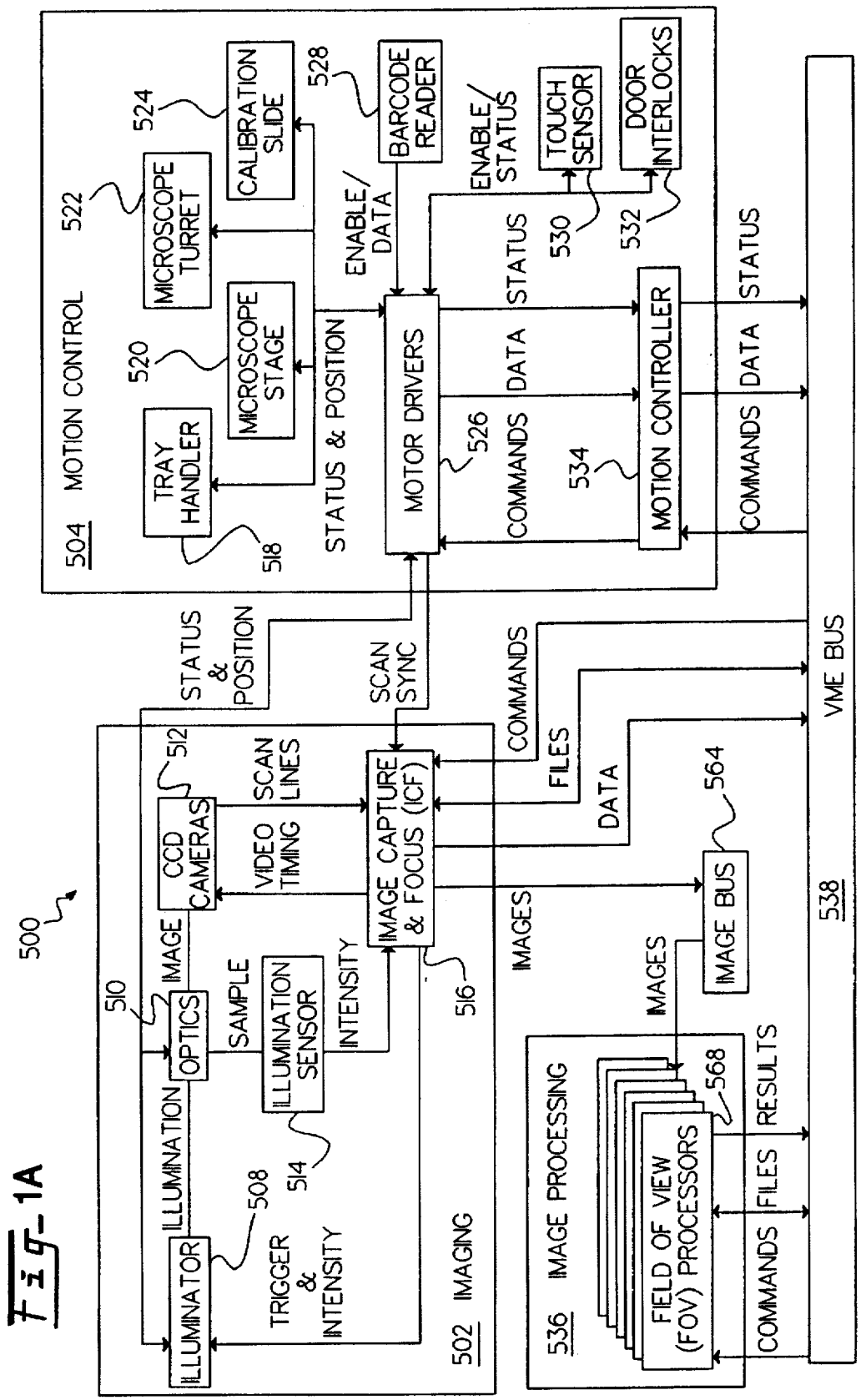

Now refer to FIGS. 1A and 1B which show a schematic diagram of one embodiment of the apparatus of the invention for checking illumination integrity for an automated microscope. While the method and apparatus of the invention will be discussed in terms of an example herein related to an automated cytology apparatus, it will be understood that the invention is not so limited. The features and principles of the invention may be applied to check urine analysis processes, semiconductor process defects, liquid crystal devices and other types of processing systems employing, for example, continuous arc lamps, filament lamps, laser sources, tube cameras, PIN diodes and photomultiplier tubes.

The apparatus of the invention comprises an imaging system 502, a motion control system 504, an image processing system 536, a central processing system 540, and a workstation 542. The imaging system 502 is comprised of an illuminator 508, imaging optics 510, a CCD camera 512, an illumination sensor 514 and an image capture and focus system 516. The image capture and focus system 516 provides video timing data to the CCD cameras 512, the CCD cameras 512 provide images comprising scan lines to the image capture and focus system 516. An illumination sensor intensity is provided to the image capture and focus system 516 where an illumination sensor 514 receives the sample of the image from the optics 510. In one embodiment of the invention, the optics may further comprise an automated microscope. The illuminator 508 provides illumination of a slide. The image capture and focus system 516 provides data to a VME bus 538. The VME bus distributes the data to an image processing system 536. The image processing system 536 is comprised of field-of-view processors 568. The images are sent along the image bus 564 from the image capture and focus system 516. A central processor 540 controls the operation of the invention through the VME bus 538. The central processor includes a host CPU 562. In one embodiment the host CPU 562 comprises a Motorola 68030 CPU. The motion controller 504 is comprised of a tray handler 518, a microscope stage controller 520, a microscope turret 522, and a calibration slide 524. The motor drivers 526 position the slide under the optics. A bar code reader 528 reads a barcode located on the calibration slide 524. A touch sensor 530 determines whether a slide is under the microscope objectives, and a door interlock 532 prevents operation in case the doors are open. Motion controller 534 controls the motor drivers 526 in response to the central processor 540. An Ethernet (TM) communication system 560 communicates to a workstation 542 to provide control of the system. A hard disk 544 is controlled by workstation 550. In one embodiment, workstation 550 may comprise a Sun Sparc Classic (TM) workstation. A tape drive 546 is connected to the processor 550 as well as a modem 548, a monitor 552, a keyboard 554, and a mouse pointing device 556. A printer 558 is connected to the Ethernet (TM) network 560.

During illumination integrity checking, the central computer 540, running a real time operating system, controls the microscope and the processor to acquire and digitize images from the microscope. The flatness of the slide may be checked, for example, by contacting the four corners of the slide using a computer controlled touch sensor. The computer 540 also controls the microscope stage to position the specimen under the microscope objective, and from one to 15 field of view (FOV) processors 568 which receive images under control of the computer 540.

Figure 1C:
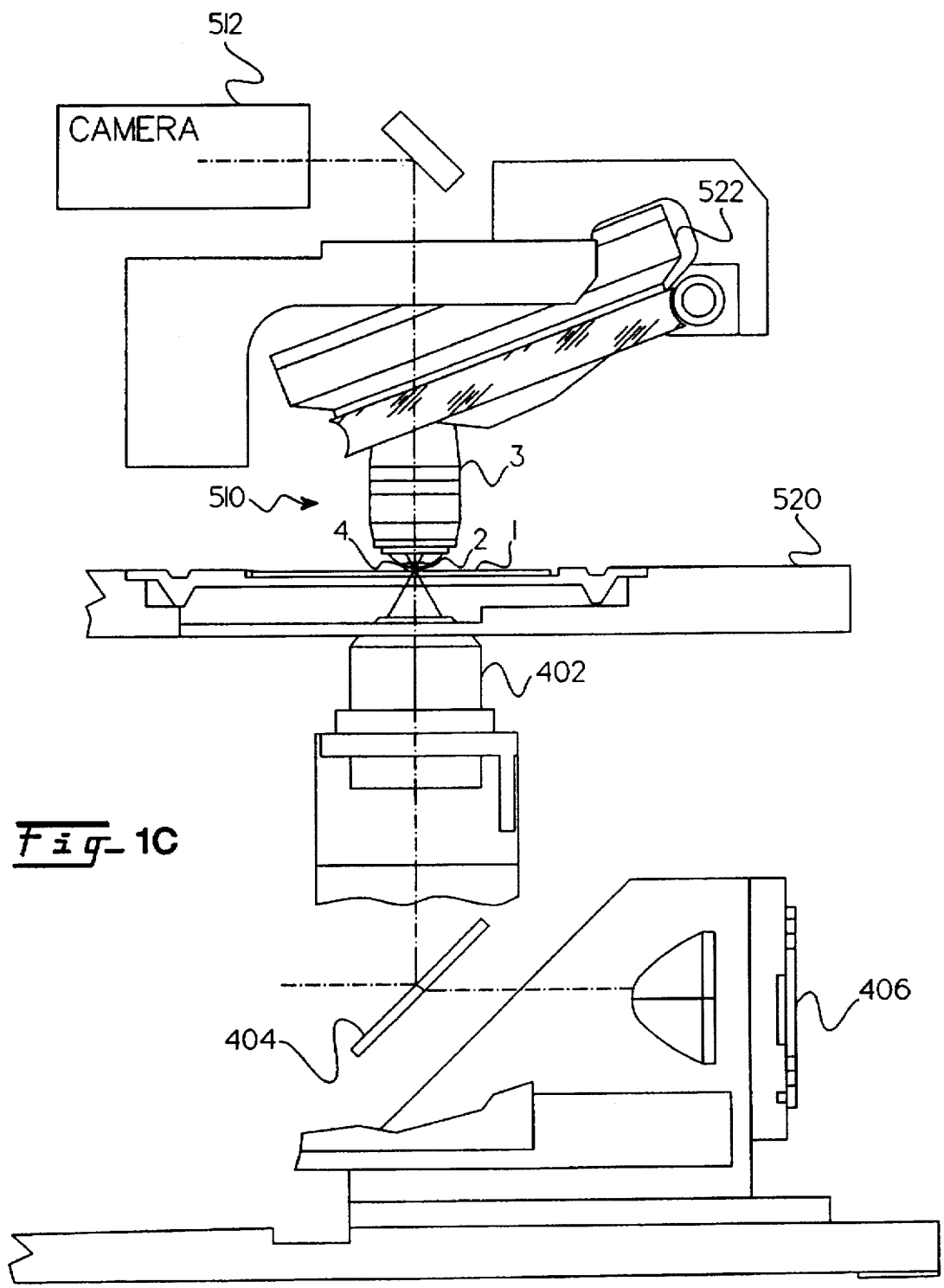
Figure 1D:
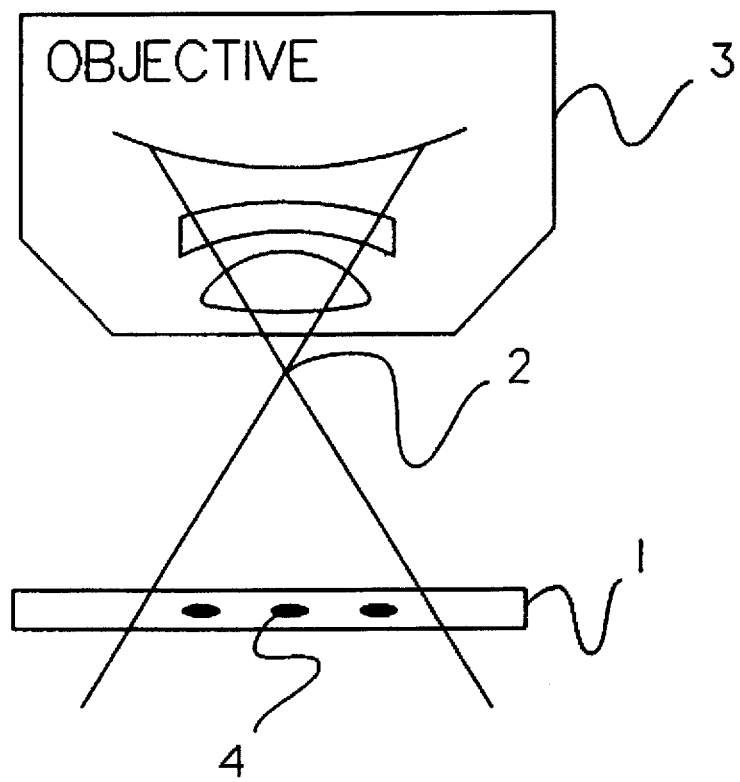

Referring now to FIGS. 1C and 1D, there shown is placement of a calibration and test target 1 into an optical path of an automated microscope 3. Several of the processes employed by the present invention require such a calibration and target plate. In the case of a transmission microscope, the calibration and test target 1 may be a clear piece of glass that is approximately 1.45 mm thick. The calibration and test target advantageously comprises specified clear areas and image primitives such as horizontal and vertical bar targets. Such calibration and test target plates are used for most transmission microscopes to simulate the optical path difference effects introduced by the substrate, coverslip and specimen media. The calibration and test target 1 is positioned longitudinally away from a plane of best focus 2 to reduce the effects of flaws in the glass and contaminants 4 that may stick to the surface of the calibration and test target plate.

Figure 5:
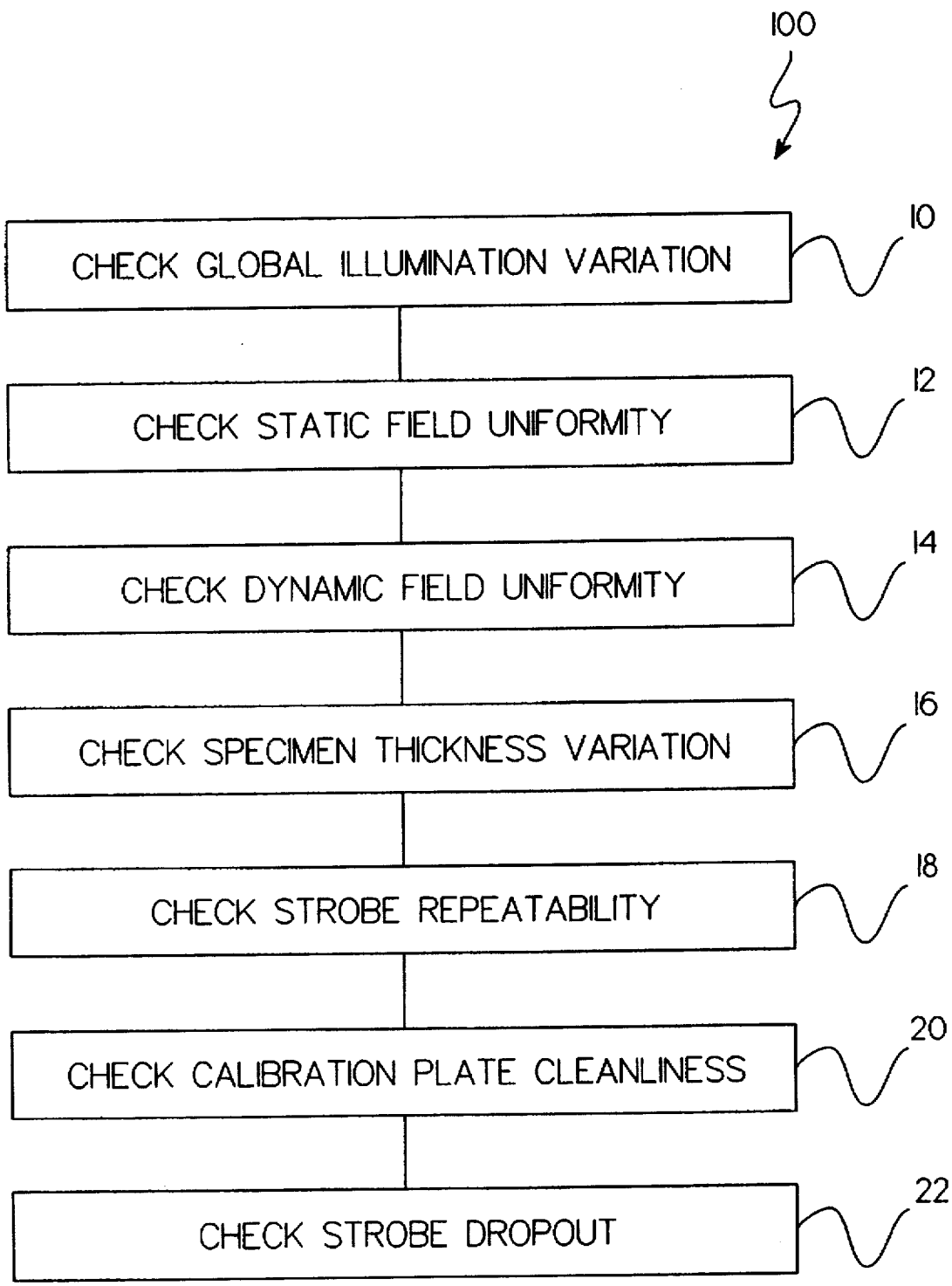
FIG. 5 shows a high level flow diagram of one example of the method of the invention to check cytological system illumination integrity.

Referring now to FIG. 5, a flow diagram of one example of the method of the invention for cytological system illumination integrity checking is shown. The order of checking process steps shown in FIG. 5 is by way of illustration only and is not intended to so limit the invention. The cytological system illumination integrity checking method 100 includes checking global illumination variation at process step 10, checking static field uniformity at process step 12, checking dynamic field uniformity at process step 14, checking specimen thickness variation at process step 16, checking strobe repeatability at process step 18, checking calibration plate cleanliness at process step 20 and checking strobe dropout at process step 22. Each of these process steps will be explained in more detail hereinbelow.

Global Illumination

Illumination sources typically employed in automated vision analysis instruments exhibit variations in energy output from one collected image to another collected image. In the case of pulsed arc lamps, the arc is unconstrained and can vary spatially between flashes. The combined effects of energy output variations and spatial variations may cause a variation of illuminance over the entire field of view from collected image to collected image. In addition, in order to approach optimal use of an imaging device, such as a CCD focal plane, the imaging device should be used as near as possible to its optimal dynamic range. That is to say, illuminance should be set at a level suitable for obtaining the optimal discrimination performance of the imaging device for the application.

Figure 6:
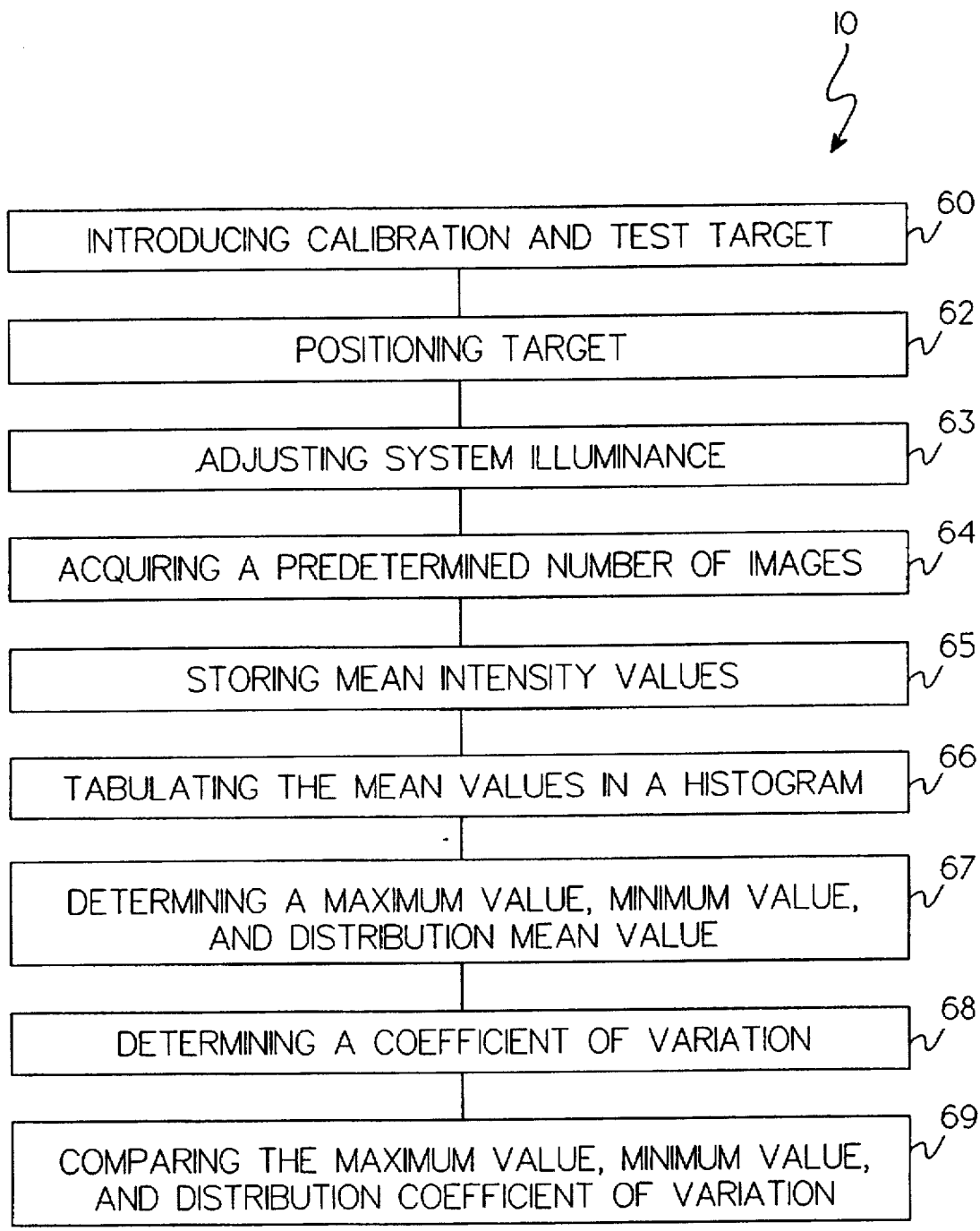
FIG. 6 shows a flow diagram of one example of a global illumination test as provided by the method of the invention.

Referring now to FIG. 6, a flow diagram of one method of the invention for providing global illumination variation tests 10 is shown. Global illumination tests are used to check the illuminance level of a light source, such as an arc lamp. A calibration and test target is introduced into the optical path at process step 60 and positioned at process step 62. At process step 63, the system illuminance is adjusted to an optimal level as may best be determined by an operator or automated system, for example. A predetermined number of images are acquired at process step 64. In one example of the invention, about one hundred (100) images are acquired. Each image may comprise a 512×512 array of pixels that are 256 grey levels deep. The mean pixel value for each acquired image is computed and temporarily stored at process step 65. These mean intensity values are tabulated at step 66 in a histogram format like that shown in Table 1. The left most column of Table 1 represents the mean intensity of the illuminated field in counts. The right most column denotes the number of occurrences of the corresponding mean field intensity for the one hundred images acquired. The center column represents a normally distributed variation with a mean and standard deviation similar to the actual data. It is only shown to demonstrate that the actual data varies in accordance with normally distributed population. Therefore, the data can be analyzed using standard statistical parameters.

Figure 2:
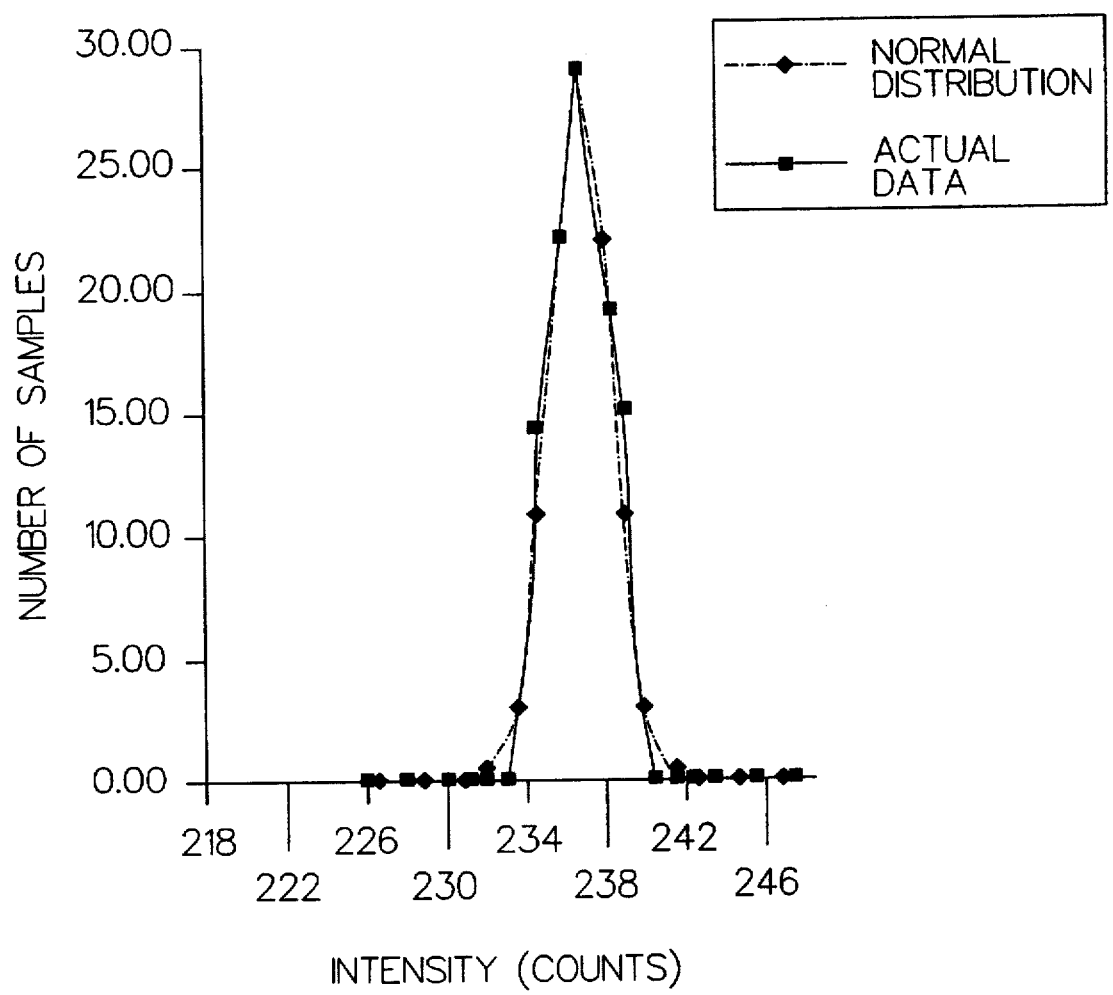
FIG. 2 shows a histogram of global illumination variation.

FIG. 2 shows a plot of the data in Table 1. It is apparent from FIG. 2 that the variation behaves like a normal random distribution. The maximum, minimum, mean and coefficient of variation for the distribution are determined at process step 67. These parameters are compared, in step 69 against engineered limits as shown in Table 2. A coefficient of variation of these mean values is determined at process step 68. Camera dynamic range is defined herein as the mean of mean voltages for all images. Examples of engineering limits used in one example of the invention for checking global illumination variation are as follows.

Camera dynamic range: 0.665 V<x<0.690 V

Coefficient of variation: <1.0%

Maximum % Variation: (max−min)/(2*mean)<1.5%

Mean: 223 counts<∞<242 counts

TABLE 1

| Intensity | Normal Distribution | Actual Data |
|---|---|---|
| 226 | 0.00 | 0 |
| 227 | 0.00 | 0 |
| 228 | 0.00 | 0 |
| 229 | 0.00 | 0 |
| 230 | 0.00 | 0 |
| 231 | 0.06 | 0 |
| 232 | 0.53 | 0 |
| 233 | 3.06 | 0 |
| 234 | 10.67 | 14 |
| 235 | 22.59 | 23 |
| 236 | 29.00 | 29 |
| 237 | 22.59 | 19 |
| 238 | 10.67 | 15 |
| 239 | 3.06 | 0 |
| 240 | 0.53 | 0 |
| 241 | 0.06 | 0 |
| 242 | 0.00 | 0 |
| 243 | 0.00 | 0 |
| 244 | 0.00 | 0 |
| 245 | 0.00 | 0 |
| 246 | 0.00 | 0 |

TABLE 2

Parameter Results and Limits Comparison

| Parameter Description | Actual Value | Limits |
|---|---|---|
| Mean Intensity | 236 | 223 counts < ∞ < 242 counts |
| Coefficient of Variation | 0.53% | <1.0% |
| Maximum % variation | 0.85% | (max−min)/(2*mean) < 1.5% |

The method of the invention for checking global illumination ensures the field of view is illuminated at the proper intensity and that the global intensity does not vary by more than the limits shown.

Static Field Uniformity

Figure 7:
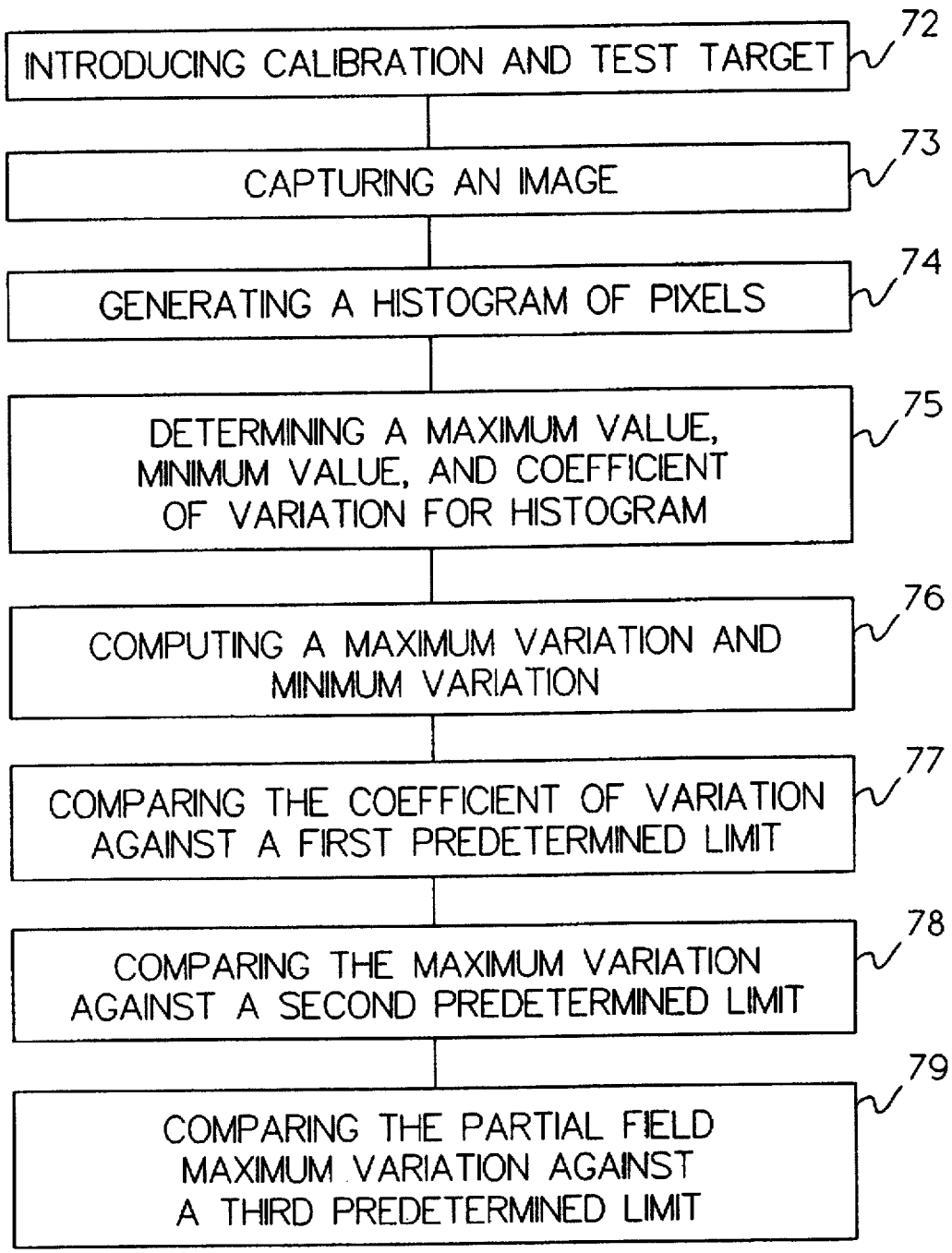
FIG. 7 shows a flow diagram of one example of a method for checking static field of uniformity as employed by the method of the invention.

Referring now to FIG. 7, a flow diagram illustrating the method of the invention for checking static field of uniformity as employed by the method of the invention is shown. The field of view illuminated in automated vision analysis instruments can vary in intensity at various points in the field due to misalignments, debris on optical surfaces, poor optical design in addition to other factors. In addition, the spatial response of the detector, such as a CCD camera, may also vary exhibiting a behavior known as patterning. The totality of these variations may be referred to as static field uniformity.

As before, a calibration and test target is introduced into the optical path at process step 72. A single image is captured and a histogram is generated for the image pixels at process steps 73 and 74 respectively. The maximum, minimum values and the coefficient of variation of the pixels are determined for the histogram at step 75. Additionally, at step 76, the maximum and minimum variation is computed for 99.9% of the field-of-view by ignoring the 0.1% outlying pixels at the tails of the histogram. This value provides a measure of the field uniformity without the affects of stray pixels. The variation factors are evaluated by comparing the coefficient of variation against a first predetermined limit 77, comparing the maximum variation against a second predetermined limit 78, comparing the partial field maximum variation against a third predetermined limit 79.

TABLE 3

Intensity Histogram of Entire Field
INT = INTENSITY, # = NUMBER OF PIXELS AT CORRESPONDING INTENSITY

| Int | # | Int | # | Int | # | Int | # | Int | # | Int | # | Int | # | Int | # |
|---|---|---|---|---|---|---|---|---|---|---|---|---|---|---|---|
| 0: | 0 | 32: | 0 | 64: | 0 | 96: | 0 | 128: | 0 | 160: | 0 | 192: | 0 | 224: | 2 |
| 1: | 0 | 33: | 0 | 65: | 0 | 97: | 0 | 129: | 0 | 161: | 0 | 193: | 0 | 225: | 7 |
| 2: | 0 | 34: | 0 | 66: | 0 | 98: | 0 | 130: | 0 | 162: | 0 | 194: | 0 | 226: | 213 |
| 3: | 0 | 35: | 0 | 67: | 0 | 99: | 0 | 131: | 0 | 163: | 0 | 195: | 0 | 227: | 1424 |
| 4: | 0 | 36: | 0 | 68: | 0 | 100: | 0 | 132: | 0 | 164: | 0 | 196: | 0 | 228: | 7803 |
| 5: | 0 | 37: | 0 | 69: | 0 | 101: | 0 | 133: | 0 | 165: | 0 | 197: | 0 | 229: | 47942 |
| 6: | 0 | 38: | 0 | 70: | 0 | 102: | 0 | 134: | 0 | 166: | 0 | 198: | 0 | 230: | 60366 |
| 7: | 0 | 39: | 0 | 71: | 0 | 103: | 0 | 135: | 0 | 167: | 0 | 199: | 0 | 231: | 74350 |
| 8: | 0 | 40: | 0 | 72: | 0 | 104: | 0 | 136: | 0 | 168: | 0 | 200: | 0 | 232: | 51837 |
| 9: | 0 | 41: | 0 | 73: | 0 | 105: | 0 | 137: | 0 | 169: | 0 | 201: | 0 | 233: | 15630 |
| 10: | 0 | 42: | 0 | 74: | 0 | 106: | 0 | 138: | 0 | 170: | 0 | 202: | 0 | 234: | 2231 |
| 11: | 0 | 43: | 0 | 75: | 0 | 107: | 0 | 139: | 0 | 171: | 0 | 203: | 0 | 235: | 317 |
| 12: | 0 | 44: | 0 | 76: | 0 | 108: | 0 | 140: | 0 | 172: | 0 | 204: | 0 | 236: | 22 |
| 13: | 0 | 45: | 0 | 77: | 0 | 109: | 0 | 141: | 0 | 173: | 0 | 205: | 0 | 237: | 0 |
| 14: | 0 | 46: | 0 | 78: | 0 | 110: | 0 | 142: | 0 | 174: | 0 | 206: | 0 | 238: | 0 |
| 15: | 0 | 47: | 0 | 79: | 0 | 111: | 0 | 143: | 0 | 175: | 0 | 207: | 0 | 239: | 0 |
| 16: | 0 | 48: | 0 | 80: | 0 | 112: | 0 | 144: | 0 | 176: | 0 | 208: | 0 | 240: | 0 |
| 17: | 0 | 49: | 0 | 81: | 0 | 113: | 0 | 145: | 0 | 177: | 0 | 209: | 0 | 241: | 0 |
| 18: | 0 | 50: | 0 | 82: | 0 | 114: | 0 | 146: | 0 | 178: | 0 | 210: | 0 | 242: | 0 |
| 19: | 0 | 51: | 0 | 83: | 0 | 115: | 0 | 147: | 0 | 179: | 0 | 211: | 0 | 243: | 0 |
| 20: | 0 | 52: | 0 | 84: | 0 | 116: | 0 | 148: | 0 | 180: | 0 | 212: | 0 | 244: | 0 |
| 21: | 0 | 53: | 0 | 85: | 0 | 117: | 0 | 149: | 0 | 181: | 0 | 213: | 0 | 245: | 0 |
| 22: | 0 | 54: | 0 | 86: | 0 | 118: | 0 | 150: | 0 | 182: | 0 | 214: | 0 | 246: | 0 |
| 23: | 0 | 55: | 0 | 87: | 0 | 119: | 0 | 151: | 0 | 183: | 0 | 215: | 0 | 247: | 0 |

TABLE 3-continued

Intensity Histogram of Entire Field
INT = INTENSITY, # = NUMBER OF PIXELS AT CORRESPONDING INTENSITY

| Int | # | Int | # | Int | # | Int | # | Int | # | Int | # | Int | # | Int | # |
|---|---|---|---|---|---|---|---|---|---|---|---|---|---|---|---|
| 24: | 0 | 56: | 0 | 88: | 0 | 120: | 0 | 152: | 0 | 184: | 0 | 216: | 0 | 248: | 0 |
| 25: | 0 | 57: | 0 | 89: | 0 | 121: | 0 | 153: | 0 | 185: | 0 | 217: | 0 | 249: | 0 |
| 26: | 0 | 58: | 0 | 90: | 0 | 122: | 0 | 154: | 0 | 186: | 0 | 218: | 0 | 250: | 0 |
| 27: | 0 | 59: | 0 | 91: | 0 | 123: | 0 | 155: | 0 | 187: | 0 | 219: | 0 | 251: | 0 |
| 28: | 0 | 60: | 0 | 92: | 0 | 124: | 0 | 156: | 0 | 188: | 0 | 220: | 0 | 252: | 0 |
| 29: | 0 | 61: | 0 | 93: | 0 | 125: | 0 | 157: | 0 | 189: | 0 | 221: | 0 | 253: | 0 |
| 30: | 0 | 62: | 0 | 94: | 0 | 126: | 0 | 158: | 0 | 190: | 0 | 222: | 0 | 254: | 0 |
| 31: | 0 | 63: | 0 | 95: | 0 | 127: | 0 | 159: | 0 | 191: | 0 | 223: | 0 | 255: | 0 |

In this embodiment the values are evaluated against the following limits.

TABLE 4

| Parameter Description | Actual Value | Limits |
|---|---|---|
| Coefficient of variation: Maximum % variation | 0.6% | <1.0% |
| (full field): Maximum % Variation | 2.6% | <6.0% |
| (partial field): | 1.7% | <3.0% |

Dynamic Field Uniformity

In addition to static non-uniformity, the illumination may vary dynamically from image to image. For example, on a given strobe flash, the field may have a maximum static variation of 15 units. On a subsequent flash, the static uniformity may be also be 15 units. However, the static uniformity on the subsequent flash may be evident in the opposite direction, resulting in an actual non-uniformity of 30 units.

Figure 3:
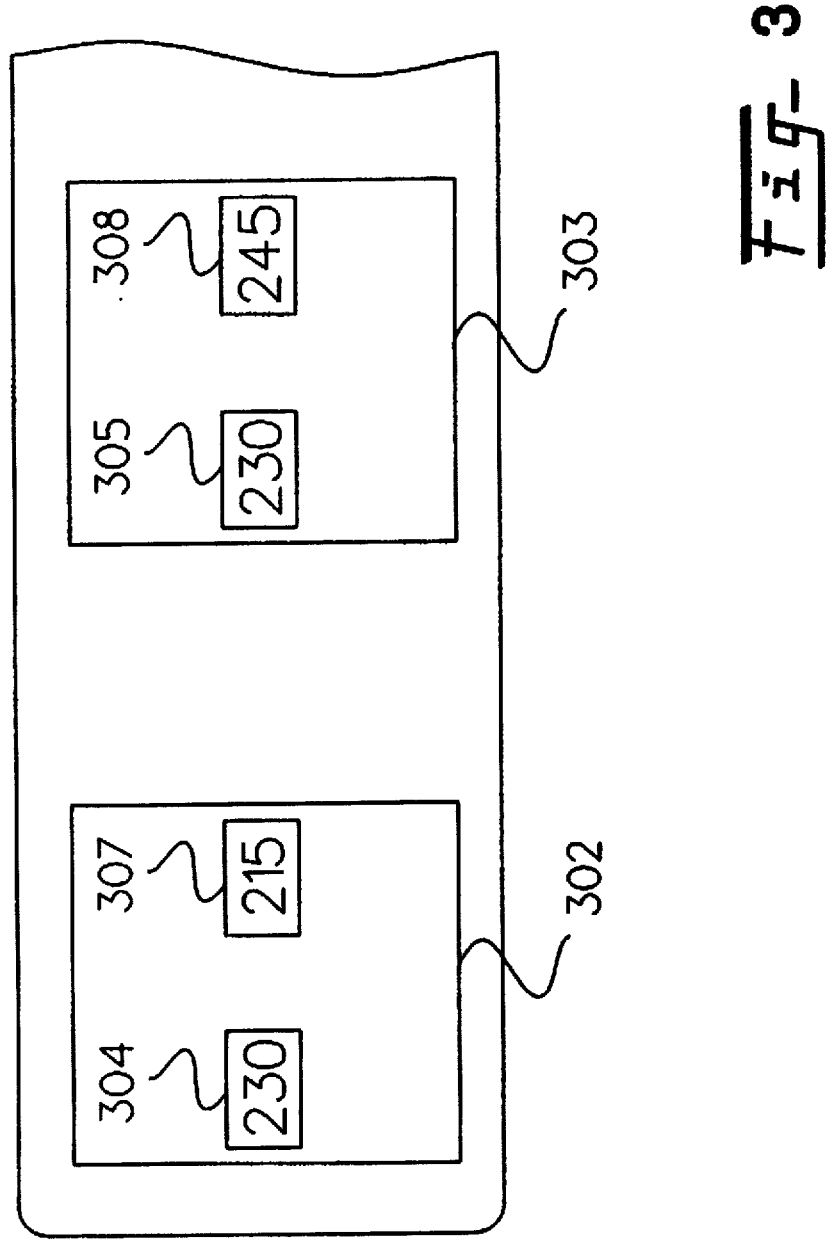
FIG. 3 shows an illustration of two illuminated fields as may be evaluated by a dynamic field uniformity test employed by the method of the invention.

FIG. 3 shows an illustration of two illuminated fields as may be evaluated by a dynamic field uniformity test employed by the method of the invention. In each of the two fields 302, 303 the pixel on the left 304, 305 respectively, maintained a value of 230. However, the intensity of the pixel on the right 307, 308 respectively differs by 30 counts between the fields. This represents a change in intensity of ±6.5%. The dynamic field uniformity test is run to check for such a condition.

Figure 12:
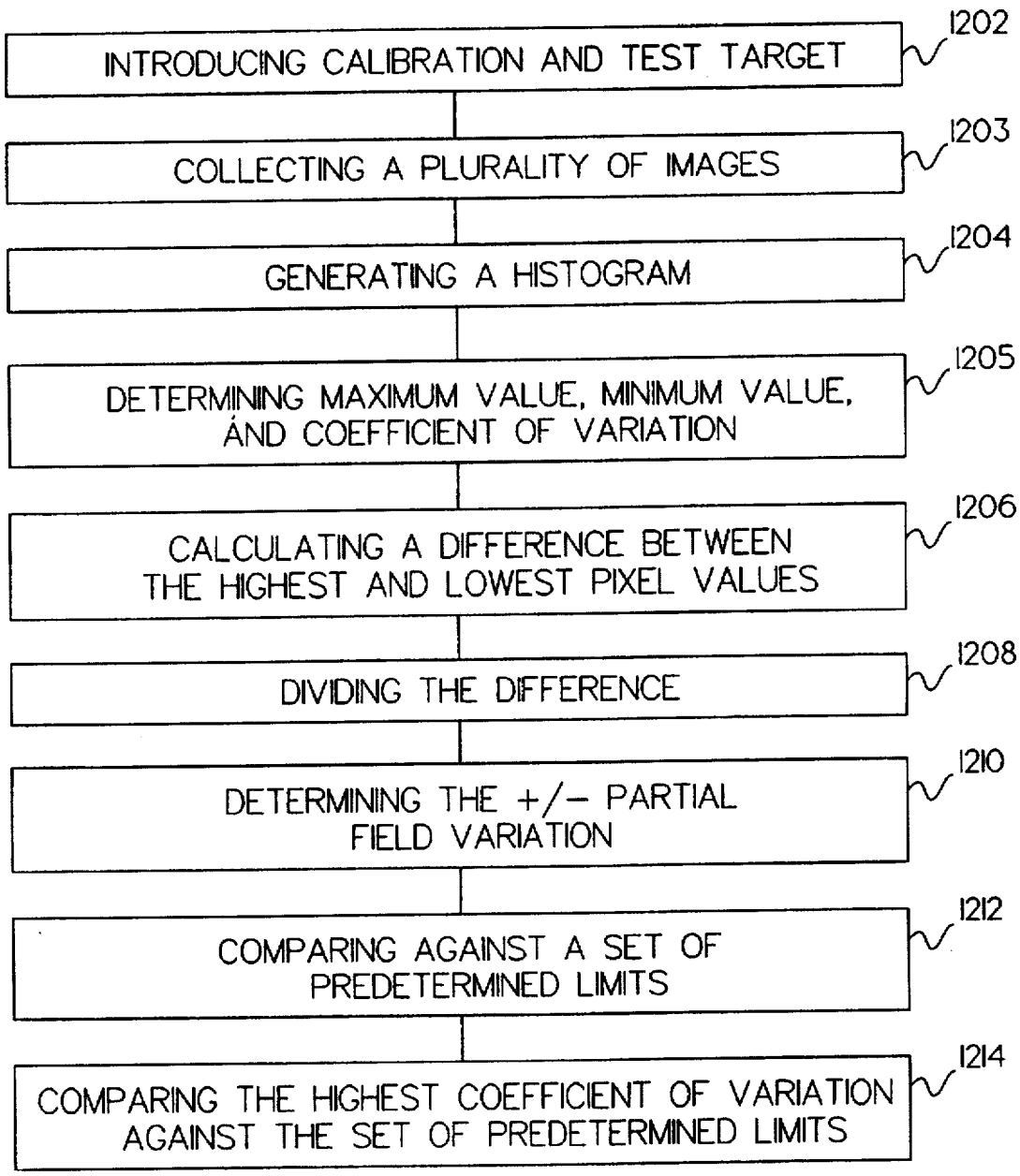
FIG. 12 shows a flow diagram of one method of the invention for checking dynamic field uniformity.

FIG. 12 shows a flow diagram of one method of the invention for checking dynamic field uniformity. As before, a calibration and test target is introduced into the optical path at step 1202. Fifty images are collected at step 1203 and a histogram is generated for each image at step 1204. The maximum values, minimum values and the coefficient of variation are determined at step 1205 for each illuminated field. Additionally, the maximum and minimum variation is computed for 99.9% of the field-of-view by ignoring the 0.1% outlying pixels at the tails of the histogram. A difference is taken between the highest and lowest pixel values for all 50 images. This value is divided by two times the mean to determine the +/− full field variations at step 1208. The same method is used to determine the +/− partial field variation at step 1210. These values are compared against limits as shown in Table 5 at step 1214. Likewise, at step 1214, the worst, that is the highest, coefficient of variation of the fifty fields is compared against the limit shown in Table 5. Table 5 also shows values from an actual test.

TABLE 5

Parameter Results and Limits Comparison for Dynamic Field Uniformity

| Parameter Description | Actual Value | Limits |
|---|---|---|
| Coefficient of variation | 0.6% | <1.0% |
| Maximum % variation (full field): | 2.8% | <8.0% |
| Maximum % variation (partial field): | 1.9% | <4.0% |

Specimen Thickness Variation

Figure 8:
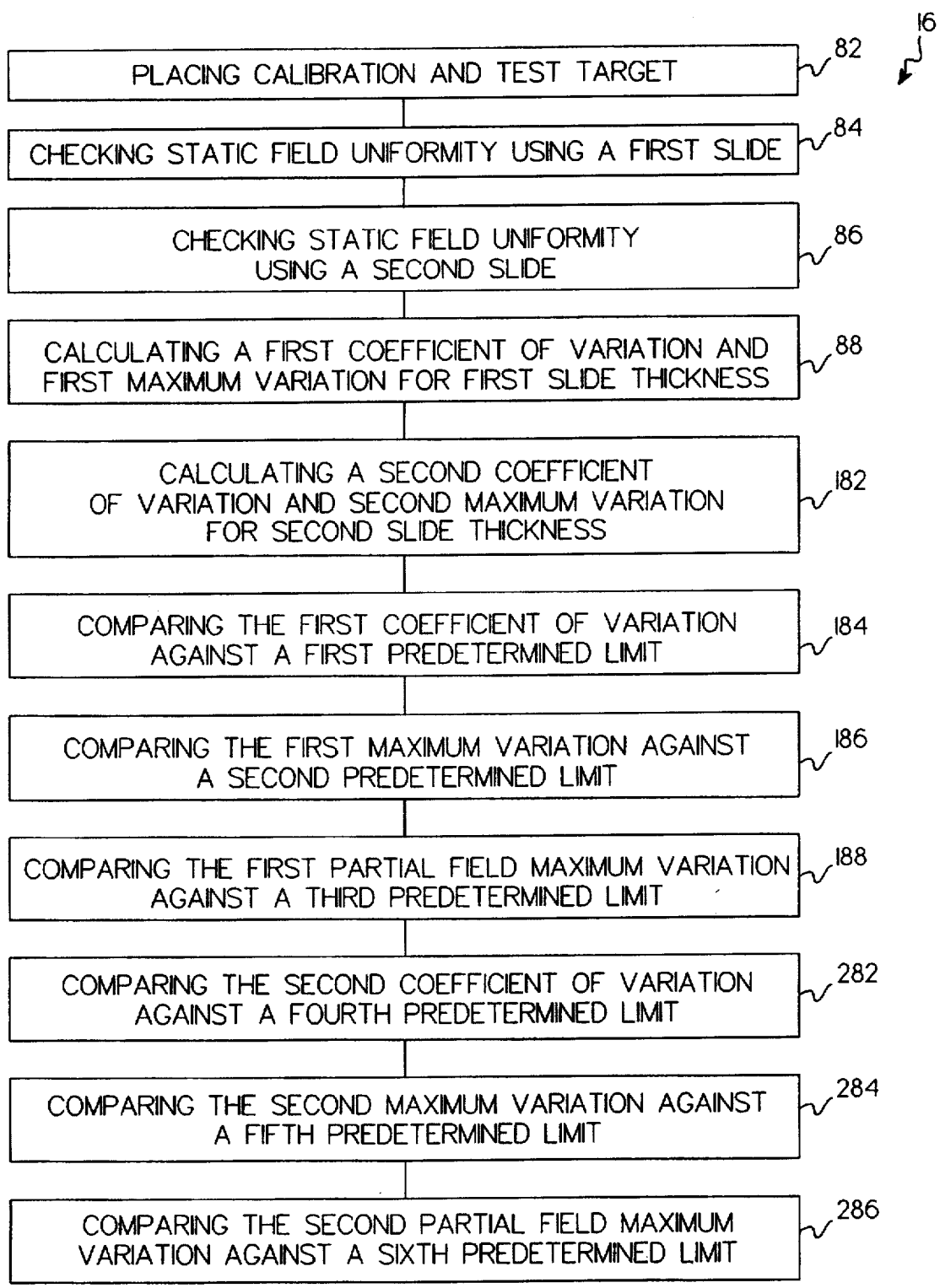
FIG. 8 shows a flow diagram of one method of the invention for checking illumination variation due to specimen thickness variation.

The illumination system of FIG. 1C, for example, is designed to operate with prescribed optical path distances. However, in transmitted light microscopy, specimens are usually mounted on a substrate and a coverslip is placed over the substrate. The thickness of the substrate or slide, coverslip and mounting media may vary. These variations introduce a change in the optical path of the illumination system. These changes, if not carefully designed for, may degrade the illumination uniformity. In addition, uniformity may degrade at the upper of lower end of the slide thickness range due to the same reasons as mentioned in the static field uniformity section. Although this degradation may occur at one or the other or both extremes, it may not occur at the nominal slide thickness. Therefore, illumination uniformity must be checked at the extremes of the designed operating limits. In this embodiment the system is designed to accommodate a range of 1.0 mm to 1.9 mm of combined slide, mounting media and coverslip thickness variations. FIG. 8 shows a flow diagram of one method of the invention for checking specimen thickness variation. A calibration and test target is introduced into the optical path 82. However, this time different parts of the calibration plate are used. The calibration plate also contains clear areas that are 1.0 mm and 1.90 mm thick. These areas are used correspondingly to conduct the thickness test. In this test the static field uniformity test, described above is run twice—once with a 1.0 mm thick slide and a second time with a 1.9 mm thick slide at process steps 84 and 86 respectively. The coefficient of variation and maximum variation, for both the full and partial fields, are recorded for each slide thickness 88. A second coefficient of variation and a second maximum variation, for both the full and partial fields, are recorded for the second slide thickness 182. The results are evaluated by comparing the first coefficient of variation against a first predetermined limit 184, comparing the first maximum variation against a second predetermined limit 186, comparing the first maximum partial field variation against a third predetermined limit 188, comparing the second coefficient of variation against a fourth predetermined limit 282, comparing the second maximum variation against a fifth predetermined limit 284, and comparing the second maximum partial field variation against a sixth predetermined limit 286.

In one embodiment of the invention the following limits were employed.

TABLE 6

Parameter Results and Limits Comparison for Thin Slide Field Uniformity

| Parameter Description | Actual Value | Limits |
|---|---|---|
| Coefficient of variation: Maximum % variation | 0.6% | <1.0% |
| (full field): Maximum % Variation | 2.6% | <6.0% |
| (partial field): | 1.7% | <3.0% |

TABLE 7

Parameter Results and Limits Comparison for Thick Slide Field Uniformity

| Parameter Description | Actual Value | Limits |
|---|---|---|
| Coefficient of variation: Maximum % variation | 0.6% | <1.0% |
| (full field): Maximum % Variation | 2.6% | <6.0% |
| (partial field): | 1.7% | <3.0% |

Strobe Repeatability

Figure 4:
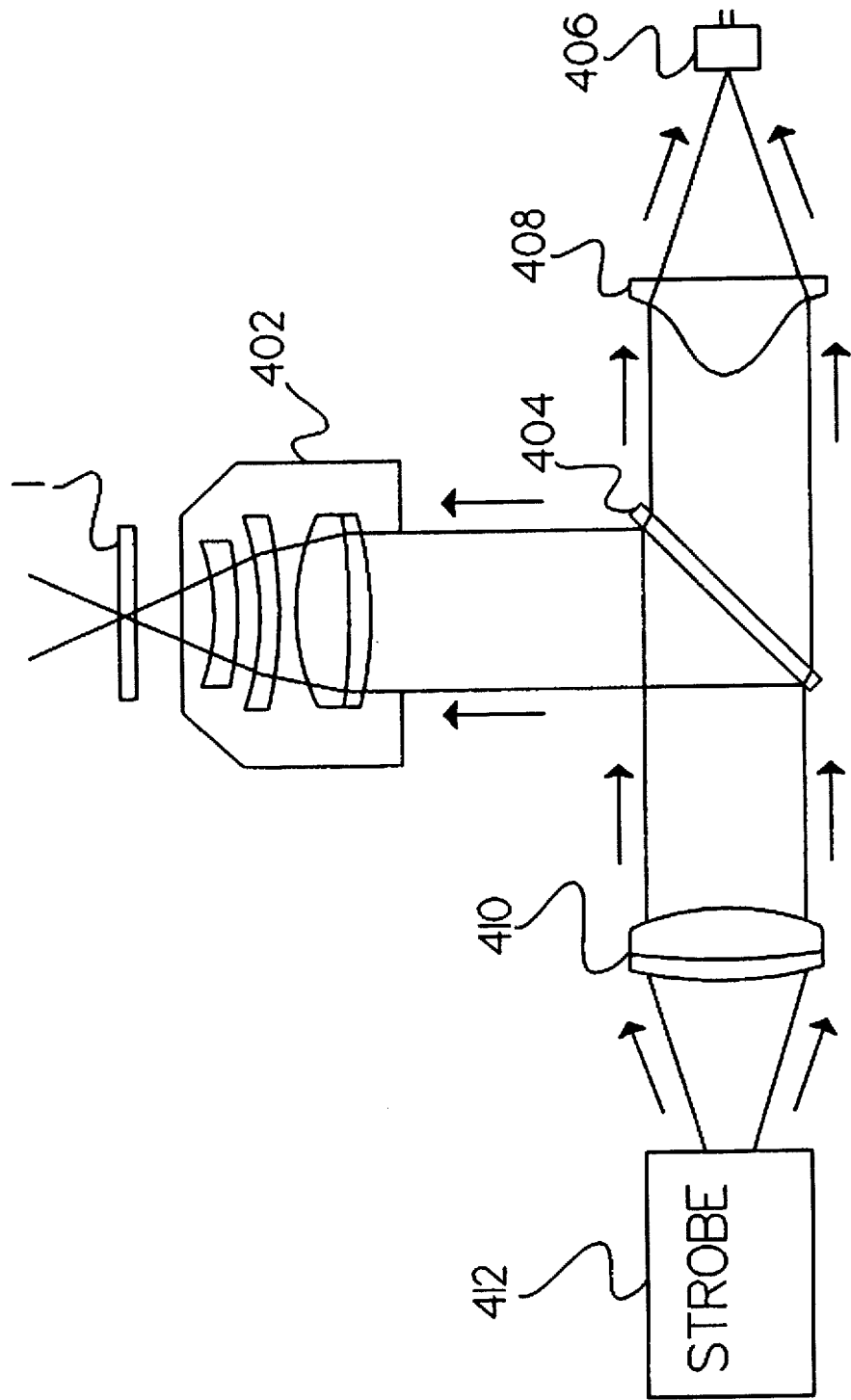
FIG. 4 shows an evaluation apparatus used in a strobe repeatability test method of the invention.

Referring now to FIG. 4, FIG. 4 shows an evaluation apparatus used in a strobe repeatability test method of the invention. In one example embodiment of the invention a pulsed arc lamp, or strobe 412, for illumination is employed. The strobe transmits light through optics 410. A beam splitter 404 is positioned to receive the light to split the light into a first beam and a second beam wherein the second beam provides illumination to condenser lens 402 for a microscopic evaluation of the slide 1. A detector 406 is positioned in an optical path defined by the beam splitter 404 and a second lens 408 to receive the first beam for providing a detected signal indicative of a first beam intensity. The automated microscope may use the detected signal to adjust for illumination variations. Alternately, a running average of detected signals may be obtained and the detected signal may be adjusted for the running average. Aging of the strobe and drive electronics can cause a strobe to become unstable and vary the energy output from flash to flash. This variation is not unlike variations that may occur in other illumination sources. The preferred embodiment shown comprises a double beam system where detector 406 comprises a PIN diode positioned to receive light from the strobe as light is split away from the main optical path of light directed toward the specimen. As shown, a beam splitter 404 is placed to split the light before it reaches the specimen.

Figure 9:
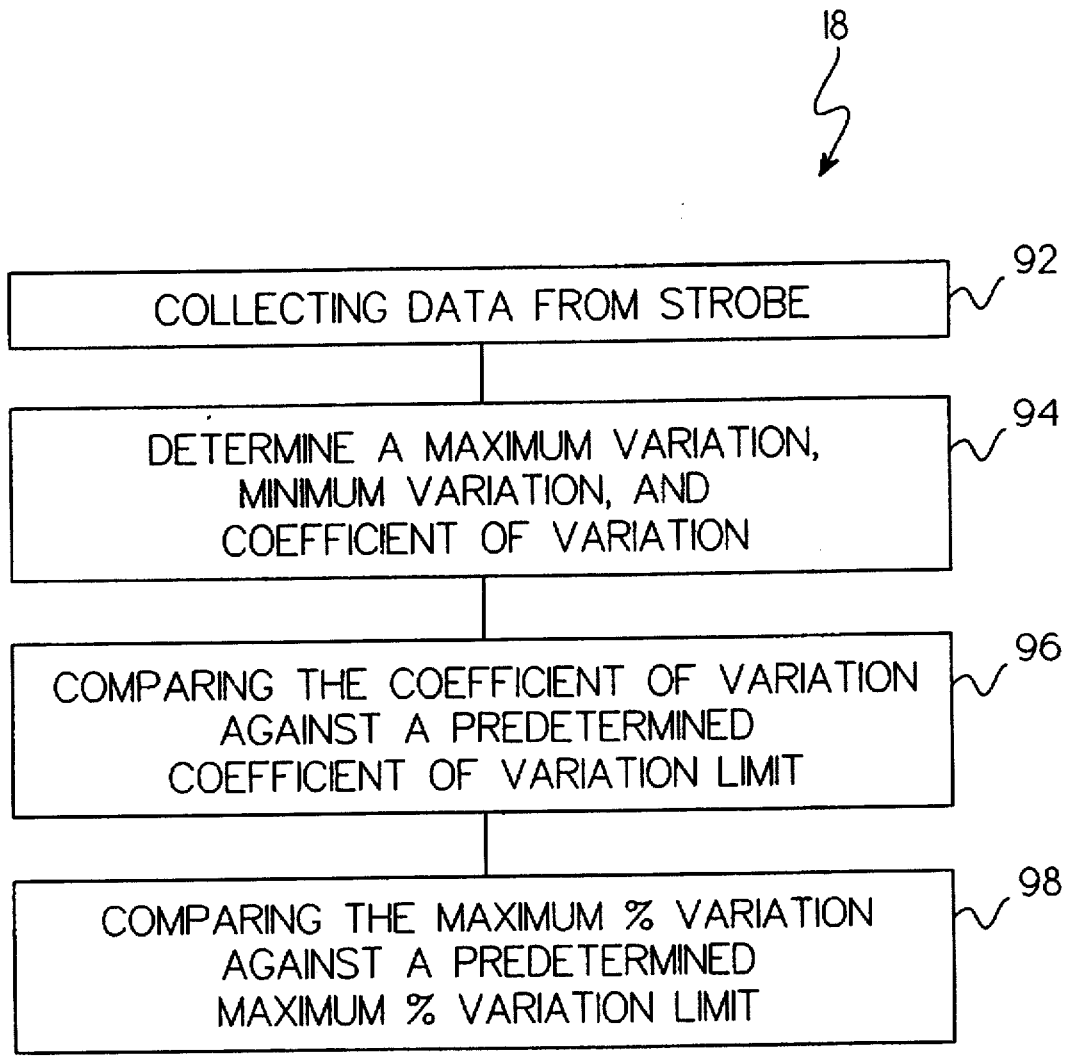
FIG. 9 shows a flow diagram of one method of the invention for checking strobe repeatability.

Referring now to FIG. 9, a flow diagram of one method of the invention for checking strobe repeatability 18 is shown. Data from the strobe may be collected during the global illumination test at process step 92. From the collected one hundred strobe flashes, the maximum, minimum and coefficient of variation of strobe output is determined at process step 94. At process step 96, the coefficient of variation is compared against a predetermined coefficient of variation limit. The results are evaluated as follows according to Table 8 at process step 98.

TABLE 8

Parameter Results and Limits Comparison for Strobe Repeatability Test

| Parameter Description | Actual Value | Limits |
|---|---|---|
| Coefficient of variation: | 0.6% | <1.0% |
| Maximum % variation: | 2.9% | <5.0% |

Calibration Plate Cleanliness

Figure 10:
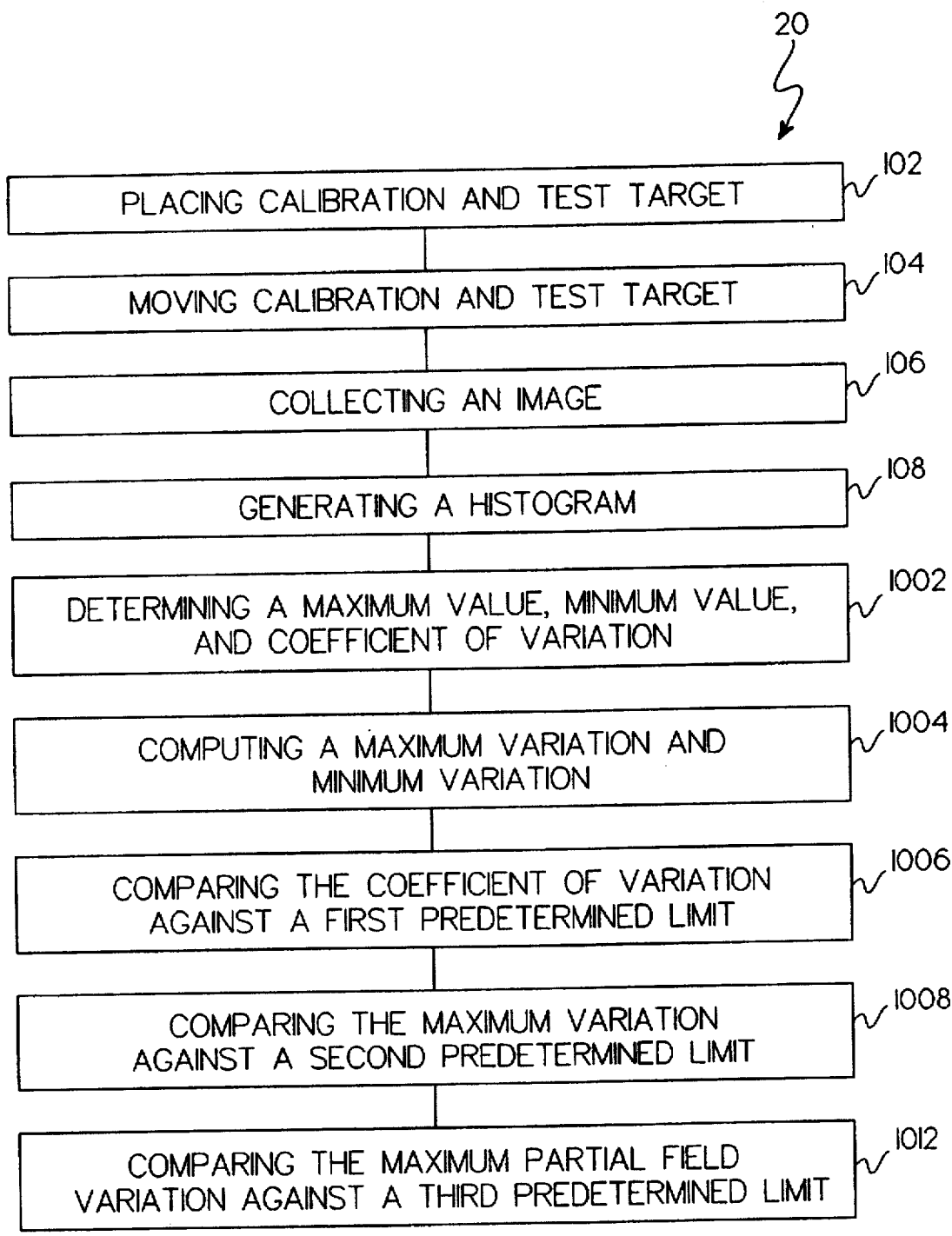
FIG. 10 shows a flow diagram of one method of the invention for checking calibration plate cleanliness.

Referring now to FIG. 10, a flow diagram of one method of the invention for checking calibration plate cleanliness 20 is shown. The calibration and target plate advantageously has a specified clear area for calibration of pixel gain and offset. At calibration, the calibration plate is lowered to remove its surfaces from the focal plane of the objectives. However, because of wide depth of field of some magnifications, large debris on the calibration plate may be visible. This can cause an erroneous calibration. The calibration plate dirt check test is run to check for this condition.

In one method for checking calibration plate cleanliness, a calibration and test target is introduced into the optical path at process step 102. At process step 104, the calibration and test target is moved about 50 microns in both x and y directions from its typical test and calibration position. This is done to highlight potentially contaminated areas that may be masked by the instrument pixel calibration. An image is collected and a histogram is generated at process steps 106 and 108 respectively. At step 1002 a coefficient of variation, for both full and partial field maximum variations are computed from the histogram data. At process step 1004 a maximum variation and a minimum variation are computed for a predetermined portion of the field-of-view by ignoring outlying pixels of the histogram so as to provide a measure of the calibration plate cleanliness. The results are evaluated by comparing the coefficient of variation against a first predetermined limit at step 1006, comparing the maximum variation against a second predetermined limit at step 1008 and comparing the partial field maximum variation against a third predetermined limit at step 1012.

One example of predetermined limits which may be employed are listed below.

Coefficient of variation: <1.0%
Maximum % variation (full field): <6.0%
Maximums % Variation (partial field): <3.0%

Strobe Dropout Monitor

Figure 11:
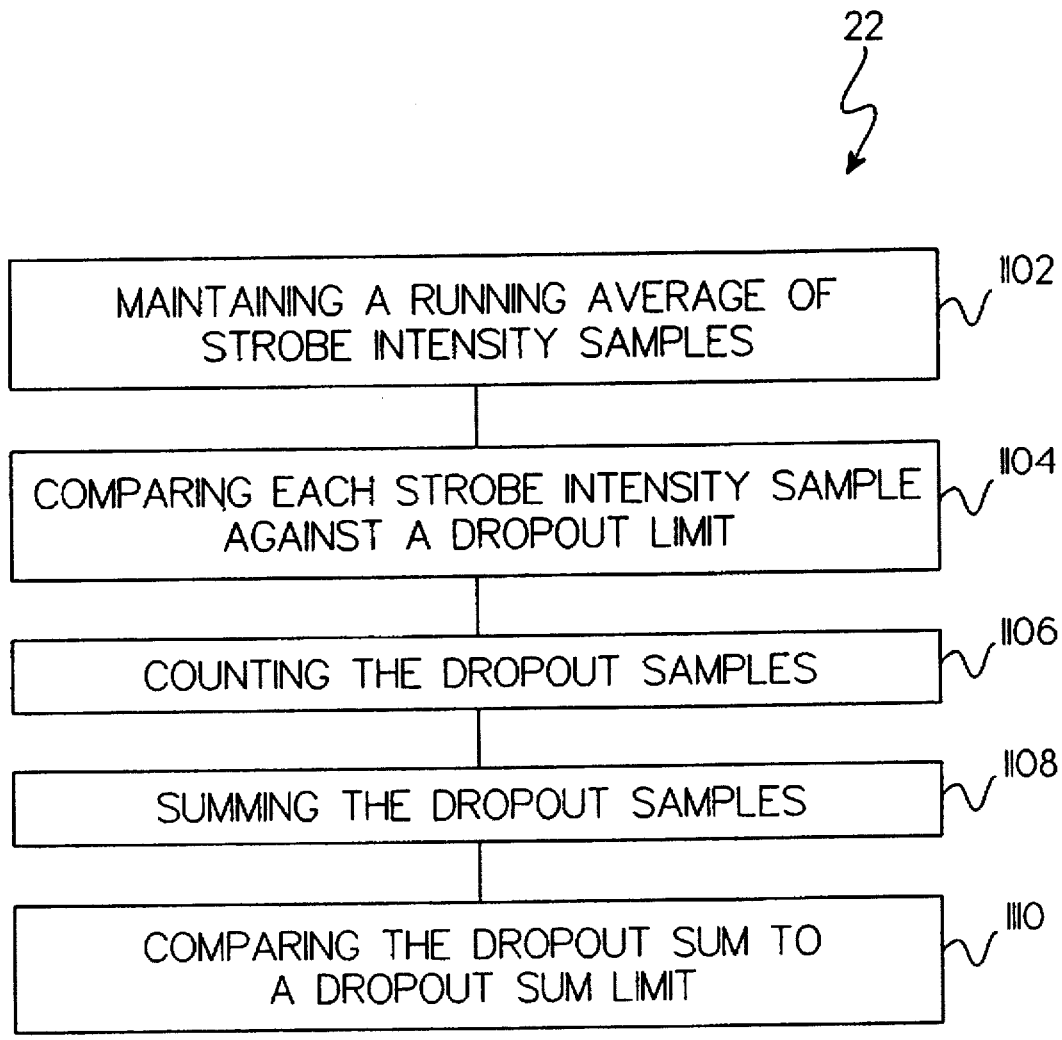
FIG. 11 shows a flow diagram of one method of the invention for checking strobe drop out.

Referring now to FIG. 11, a flow diagram of one method of the invention for checking strobe drop out is shown. The method includes the steps of maintaining a running average of strobe intensity samples over a predetermined number of samples 1102, comparing each strobe intensity sample against a dropout limit 1104, counting each strobe intensity sample which does not meet the dropout limit as a dropout sample to obtain a plurality of dropout samples 1106, summing the plurality of dropout samples occurring during a predetermined event to produce a dropout sum 1108, and after the predetermined event, comparing the dropout sum to a dropout sum limit 1110.

In operation, occasionally, a strobe lamp will generate arcs that are erratic in position or energy output. This type of behavior can cause the illumination system to produce a field of lower illuminance. In this embodiment of the invention, the strobe is constantly monitored. A running average of the strobe is maintained consisting of 500 samples. All samples taken that exceed 5% of the running average are considered drop outs. The strobe drop out monitor test sums these dropouts during a tray of processing (8 slides), or roughly one hour. After processing a tray, the sum is compared to a limit. In this embodiment, the total of acceptable errant flashes is around 0.03%. The limit is evaluated against a standard as follows:

strobe dropouts greater than 5%: <30 dropouts per tray.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

For example, this invention comprises of a suite of tests and parameter monitoring scheme to characterize certain facets of illumination. The above-described tests refer specifically to a system with a pulsed arc lamp and CCD imaging device. However, the concepts may be employed to continuous arc lamps, filament lamps, LASER sources, tube cameras, TDI sensors, tube cameras and PIN diodes and photomultiplier tubes.

What is claimed is:

1. A method of checking global illumination variation of an optical system illuminated by an illumination system comprising the steps of:

(a) acquiring a predetermined number of images of a calibration and test target with the optical system by introducing a calibration and test target into an optical path of the optical system, positioning the calibration and test target longitudinally away from a plane of best focus, adjusting system illuminance to an acceptable level and acquiring the predetermined number of images; and (b) determining the global illumination variation of the optical system from the predetermined number of images of the calibration and test target by storing a plurality of mean intensity values, where a mean intensity value is stored for each image, tabulating the plurality of mean values in a histogram format to form a mean value distribution, determining a maximum value, a minimum value and a distribution mean value for the mean value distribution, determining a coefficient of variation for the mean value distribution and comparing the maximum value, minimum value and distribution coefficient of variation against a set of predetermined specifications, wherein global illumination variation comprises temporal variation in mean illuminance of a field of view in the optical system.

2. The method of claim 1 further comprising the steps of:

(a) determining a camera dynamic range as the mean of mean voltages for all images;

(b) determining the coefficient of variation;

(c) determining a maximum percent variation; and (d) determining a mean camera dynamic range.

* * * * *